Aug. 31, 1965  D. F. FLEGEL  3,203,265
RATE OF CHANGE CONTROLLER
Filed July 23, 1962
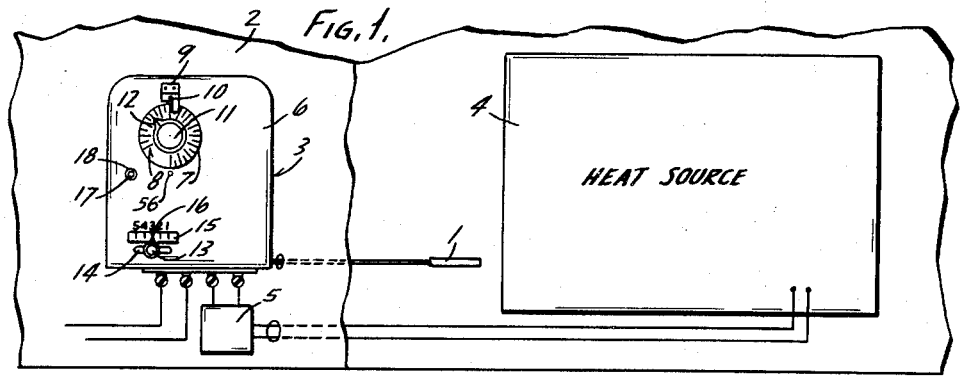
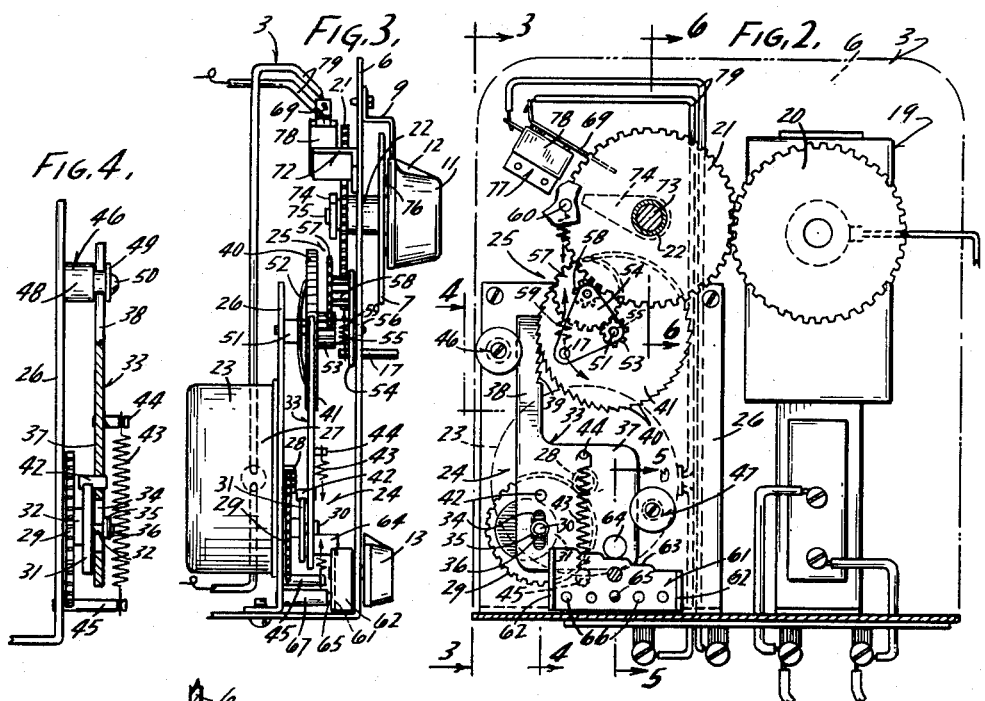
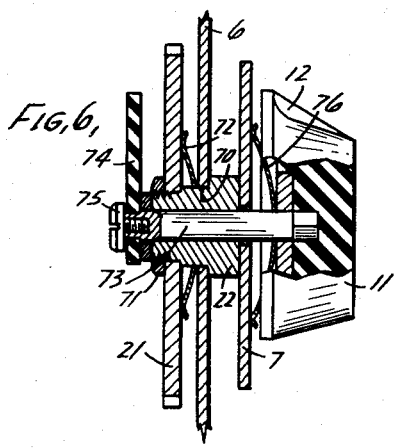
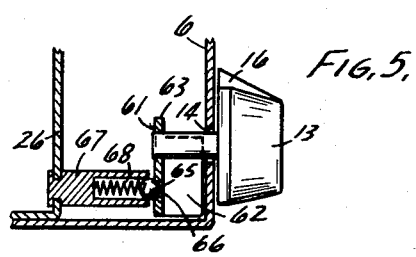
INVENTOR.
DEAN F. FLEGEL
BY
ANDRUS & STARKE
ATTORNEYS.

United States Patent Office 3,203,265
Patented Aug. 31, 1965

3,203,265
RATE OF CHANGE CONTROLLER
Dean F. Flegel, Racine, Wis., assignor to Reliance Time
Controls, Inc., Racine, Wis., a corporation of Wisconsin
Filed July 23, 1962, Ser. No. 211,535
6 Claims. (Cl. 74—124)

This invention relates to a rate of change controller and particularly to an electromechanical drive system for varying a temperature or like control setting at an adjustable predetermined rate within any given time period.

In various processes and controls, the functions and operating elements are automatically controlled in accordance with a predetermined sequence. For example, in the curing of tobacco, the leaves are properly positioned in a curing building or barn and sequentially subjected to different proper temperatures and humidities for first yellowing the tobacco leaves, then drying the leaf portion and finally drying the stem portion. In each step of the curing process, the temperature is preferably increased at a predetermined rate over a given period at which time the temperature should be held constant until the next step is begun. Generally, in tobacco curing, the temperatures have been manually adjusted within each drying process in order to increase the temperature in stepped relation. Although automatic temperature drive systems are known, generally the time element must be calculated and adjustment made to the mechanism to provide the desired temperature variation. Further, many of the systems controlling devices are of a relatively sophisticated and complicated construction. The present invention has been applied to the process of curing tobacco and is therefore described in connection therewith for purposes of explanation.

The present invention is directed to an improved adjustable drive coupling for establishing different rates of change until a desired temperature is established at which time the temperature is held constant. The device is of a simple, rugged and reliable construction and is particularly adapted to practical application in curing tobacco and the like. The present invention particularly employs a system wherein the operator sets a temperature indicator at the present temperature and an automatic disconnect actuator at a final temperature relative to the temperature indicator. A cooperative rate control is set to automatically change the temperature by similar increments from the present temperature to the final temperature in a given base time.

In accordance with the present invention, a drive gear is coupled to a temperature regulator. A temperature reading dial is associated with the gear for setting of the gear at the existing temperature. A gear train is releasably coupled to the dial gear and includes as an input a ratchet wheel. A ratchet pawl is mounted for reciprocal movement with an operating portion engaging the ratchet wheel for rotating of the wheel in stepped relation in response to each cyclic movement of the pawl. The pawl is coupled to a cam which is driven at a constant speed for movement of the pawl and the coupling includes a lost motion connection such that the movement of the cam or the pawl can be held to move less than a maximum stroke. In accordance with the present invention, the movement is limited through a plate member having a plurality of time increment surfaces engaging a portion of the pawl and holding the pawl at a limited movement within its maximum cycle. Each of the positions of the plate is interrelated with the mechanism of the pawl and drive gear train to establish a predetermined temperature increase of the temperature regulator. For example, if the temperature is to vary five degrees per hour, a proper time increment surface aligned with the pawl adjusts the temperature regulator in a series of similar increments totaling five degrees per hour.

The drawings furnished herewith illustrate the best mode presently contemplated for carrying out the invention.

In the drawings:

FIG. 1 is a diagrammatic illustration of a controller constructed in accordance with the present invention applied to a temperature control for tobacco curing or the like;

FIG. 2 is an enlarged front elevational view with parts of a front panel broken away to show details of construction;

FIG. 3 is an enlarged side elevational view taken on line 3—3 of FIG. 2;

FIG. 4 is a vertical section taken on broken lines 4—4 through FIG. 2 showing the cam mounting;

FIG. 5 is a vertical section taken on line 5—5 of FIG. 2 through a spring loaded ball detent; and FIG. 6 is a vertical section showing the temperature setting members of FIGS. 1-3.

Referring to the drawings and particularly to FIG. 1, a temperature responsive element 1 such as a bulb filled with a temperature sensitive liquid is shown mounted within a tobacco housing curing barn 2 of which only a fragmentary portion is shown. Element 1 is located in the barn 2 where it is exposed to the average temperature therein. The tobacco leaves, not shown, are hung in the tobacco barn and are subjected to varying temperatures and humidities for yellowing, leaf drying and stem drying, as previously discussed. The present invention provides automatic temperature control and the usual practices for ventilation are provided for control of the humidity. A combined thermostatic and temperature rate increase controller 3 is suitably mounted upon an exterior wall of the barn 2 and is coupled to control a furnace or other heat source 4 by a pair of suitable control lines to a control unit 5 also mounted on the exterior wall and connected by suitable lines to heat source 4. The controller 3 and control unit 5 are exteriorly mounted to avoid the high temperatures in barn 2 and a suitable cover, not shown, is preferably provided to protect them from the elements. The heat source 4 is generally an oil fired heating unit of known construction and no further description thereof is considered necessary. The controller 3 includes a suitable outer housing having a front wall or panel 6. A thermostat dial 7 is rotatably mounted in the front panel and includes temperature indicia 8 circumferentially spaced on the face thereof. An indicator plate 9 is secured immediately above the dial 7 and includes a small vertical reading line 10 which in cooperation with the indicia 8 provides a reading of the temperature in the barn 2. The dial 7 is adapted to be grasped by the outer edge and rotated with respect to the reading line 10 for initial setting of the controller to the existing temperature in the barn 2. A final temperature setting knob 11 is rotatably mounted coaxially of the dial 7 and is adapted selectively to move independently of the dial 7 and simultaneously with the dial 7 as hereinafter more fully described. The knob 11 includes a radially projecting pointer 12 which in cooperation with the indicia 8 of the dial 7 provdes for proper setting of the knob 11 in the control mechanism associated therewith. After proper setting of the dial 7, the knob 11 is set with the pointer 12 at the finally desired temperature for the particular portion of the curing process. In the lower portion of the panel 6 of the controller 3, a temperature rise control knob 13 is slidably mounted for horizontal movement in the slot 14 in panel 6. Temperature rate indicia 15 is provided immediately above the knob 13 which has the usual pointer 16 for settings of the knob at the desired rate. In the illustrated embodiment of the invention, the indicia 15 includes five settings denoted by the numerals 1 through 5 respectively. Each of the numbers is related to a desired degrees increase per hour. A temperature resetting pin 17 is mounted for vertical slight arcuate movement within a slot or opening 18 in panel 6 and functions, as hereinafter described, to allow resetting of the dial 7.

Referring particularly to FIGS. 2 and 3, the controller 3 includes a suitable temperature regulator 19 to which the temperature responsive element 1 is coupled in a known manner and no further description thereof is given.

An input gear 20 is provided for setting of the temperature regulator 19 and determining the temperature which will be established within the barn 2 through suitable actuation of the heat source 4. A dial gear 21 is rotatably mounted in mesh with the input gear 20 by a dial shaft 22 which is rotatably mounted in the front panel 6 and supports the dial 7 in proper relation to the indicator plate 9. A timer motor 23 is mounted behind the panel 6 and coupled through an adjustable cam drive 24 and a gear train 25 to rotate the dial gear 21 in a stepped fashion for resetting the coupled input gear 20 in predetermined increments. A mounting plate 26 is bolted or otherwise secured in rearwardly spaced relation to the front panel 6 and supports the timer motor 23, the adjustable cam drive 24 and the gear train 25.

The timer motor 23 is bolted or otherwise secured to the back side of the mounting plate 26 and includes a gear reduction portion 27. A drive gear 28 is connected to the output of the gear reduction portion 27 and is rotatably disposed on the opposite side of the mounting plate 26. A relatively large cam gear 29 is rotatably mounted on a cam shaft 30 which is fixed to plate 26 and projects forwardly toward the front panel 6. A circular disc cam 31 is secured to the cam gear 29 as by riveting the cam gear and the cam into opposite sides of a spacer or hub 32 for rotation on shaft 30 as a unit. Cam 31 is secured eccentrically of shaft 30 to provide the desired cam action, as hereinafter described. A cam pawl 33 includes a vertical slot 34 through which the cam shaft 30 projects and a ring bushing 35 is secured on the shaft and extends over the lateral edges of the slot 34 to hold the pawl 33 onto the shaft. A snap spring 36 fits in a small annular groove in the outermost end of the cam shaft 30 and locks the several elements onto the shaft.

The cam pawl 33 includes a lower rectangular body portion 37 from which an operating extension or arm 38 extends upwardly. Pawl teeth 39 are provided on the uppermost vertical inner edge of the pawl arm 38. The teeth 39 engage suitable notches 40 on the periphery of a ratchet wheel 41 forming a part of the gear train 25. The upper edges of teeth 39 are generally horizontal with an inwardly inclined side edge such that the wheel 41 rotates only when the pawl moves upwardly.

A pin follower 42 is fixed to the pawl 33 immediately above the vertical slot 34 and engages the adjacent edge of the circular disc cam 31 such that the pawl is moved in a vertical direction in response to the rotation of the cam 31. The cam 31 is rotated through a predetermined number of complete revolutions during each hour period to establish the temperature increase in a predetermined number of increments. For example, a six minute cycle may be established and the pawl 33 moves upwardly once each six minutes to reset the regulator 19 ten times each hour with each sub-increment equally one tenth of the total preset rise per hour.

A coil spring 43 is secured at one end to a pin 44 in the top of the body portion 37 of the pawl 33 and at the opposite end to a pin 45 on the mounting plate 26. The spring 43 continuously urges the pawl downwardly and holds the pin follower 42 in engagement with the edge of the cam 31. Vertical guides 46 and 47 are secured respectively in engagement with the upper outer vertical edge of the pawl arm 38 and the opposite edge of the body portion 37 of pawl 33.

As shown most clearly in FIG. 4, each of the vertical guides 46 and 47 generally consists of a stepped cylindrical body 48 secured to the mounting plate 26 with a reduced outer end generally corresponding to the thickness of pawl 33. A washer 49 is secured to the end of the cylindrical body 48 by a suitable lock screw 50 and defines an annular groove within which the edge of the pawl 33 slides. The guides 46 and 47 are spaced laterally to allow slight angular movement or pivoting of the pawl 33 about the cam shaft 30. This is necessary to allow pivotal movement of the upper end of the pawl 33 with respect to the ratchet wheel 41 during the return or down stroke of pawl 33. The ratchet wheel 41 is a relatively large wheel having a predetermined number of peripheral teeth or notches 40. The ratchet wheel 41 is rotatably mounted on a shaft 51 which projects inwardly from the mounting plate 26. A dished flat spring 52 having three equicircumferentially spaced radial arms is disposed on shaft 51 between the mounting plate 26 and the face of the ratchet wheel 41. In the assembled relation, spring 43 positions the ratchet wheel 41 in alignment with the teeth 39 of the pawl arm 38 for selective engagement therewith during the upward movement of the pawl. A small driving gear 53 is rotatably mounted on shaft 51 and secured to the ratchet wheel 41 for simultaneous rotation therewith. A gear plate 54 which is generally of a triangular configuration in FIG. 2 includes a bearing 55 secured within one corner thereof and rotatably disposed on the gear shaft 51.

In the assembled relation, a reduced outer end of the gear shaft 51 is journaled within an opening 56 correspondingly sized in the panel 6 and the dished flat spring 52 properly holds the elements between the forward or inner face of the panel 6 and the spring surfaces.

The gear plate 54 carries a relatively large idler gear 57 meshing with the driving gear 53 and a small gear 58 coaxially secured to gear 57 which meshes with the large dial gear 21. A coil spring 59 is secured at one end to the inner end of the reset pin 17 which is fixed to plate 54 and at the opposite end to a pin 60 which is secured to the panel 6. The coil spring 59 continuously urges plate 54 to a position holding the gear 58 in engagement with the dial gear 21.

The gear train interconnects the vertical movement of the pawl 33 to the dial gear 21 and the reciprocation of the pawl 33 results in a stepped clockwise rotation, as viewed in FIG. 2, of the dial gear 21 each time that the pawl 33 moves upwardly with the teeth 39 engaging the notches 40 of ratchet wheel 41. The amount of rotation is dependent upon the rectilinear length or stroke of movement of the cam pawl 33. This is adjusted in accordance with the present invention by properly positioning the temperature rise control knob 13.

The reset pin 17 is fixed to and projects outwardly from the gear plate 54 through the opening 18 in the panel 6. The engagement of teeth 39 of the cam pawl 33 with the notches 40 of wheel 41 prevents reverse rotation of the ratchet wheel. Consequently, in the normal operating position, the thermostat dial 7 and the attached dial gear 21 cannot be rotated in a reverse or counterclockwise direction. By depressing the reset pin 17, the gear 58 disengages the dial gear 21 and allows independent and free movement thereof.

The temperature rise control knob 13 is connected to a stepped plate 61 which is slidably mounted spaced from the back side of the front panel 6 by end walls 62. Plate 61 includes a stepped upper edge 63 which is horizontally aligned with a guide post 64 extending horizontally from the lower end of and over the edge 63. The downward movement of the cam pawl 33 under the conjoint action of cam 31 and spring 43 is limited in accordance with the aligned level of the stepped upper edge 63 of the plate 61. As previously described, the present embodiment of the invention is adapted to establish five different rate increases.

The amplitude or magnitude is determined by varying the stroke of pawl 33 such that for a corresponding number of complete cycles of cam 31 and pawl 33, the gears 20 and 21 are rotated the desired number of degrees. Consequently, the stepped upper edge 63 includes five levels with adjacent levels varying by equal increments to establish similar equal variation in the rate of increase.

Referring particularly to FIGS. 2, 3, and 5, the plate 61 is releasably secured in place by a spring loaded ball 65 which cooperates with suitable plate openings 66 one for each level of the upper edge 63. A hollow pin 67 is secured to the mounting plate 26 and projects forwardly in slightly spaced relation to the plane of the stepped plate 61. A small coil spring 68 is disposed within the hollow pin 67 and continuously urges ball 65 outwardly into engagement with the stepped plate 61. When the temperature rise rate knob 13 is properly positioned in one of the five desired positions, the ball 65 enters into a proper opening 66 and releasably secures the plate 61 in the desired position.

In this manner, the temperature is caused to increase in a series of steps within each time setting. For example, assume the initial temperature is to 100° and a final temperature of 140° is desired with a temperature change of 5° per hour. The knob 13 would be set at the number five. The temperature will then change at 5° for each hour but within each hour the temperature will increase in sub-increments, for example, ten equal steps where the cam 31 is rotated one complete revolution each six minutes as previously described. Each complete cycle causes the cam pawl 33 to reciprocate completely once and to reset the gears 20 and 21 a distance equal to one-tenth of five degrees and correspondingly advance the control of the heat source 4 to obtain the desired increase in temperature. The temperature in barn 2 is thereby advanced gradually until the desired temperature corresponding to that established by the setting of the knob 11 is obtained at which time in accordance with the present invention, the timer motor 23 is de-energized as a result of operation of a suitable switch 69 shown mounted behind panel 6 in FIGS. 2 and 3.

Referring particularly to FIG. 6, the dial shaft 22 is shown as a hollow shaft mounted in a suitable opening 70 in the panel 6. An enlarged boss is integrally formed on the outer end of the hollow shaft 22 and the dial 7 is pressed onto a reduced outermost end or otherwise fixed to the forwardmost end thereof. The dial gear 21 is secured to the inner end of the shaft 22 behind the panel 6 by a lock nut 71 which threads onto a correspondingly threaded inner end portion of the shaft and clamps the gear between the lock nut and a shoulder on the shaft, as most clearly shown in FIG. 6. A dished flat spring 72 having three arms acts between the back side of the panel 6 and the adjacent face of the gear 21 and frictionally holds the gear 21 in place while setting of the knob 11, as presently described.

A shaft 73 is rotatably disposed or journaled within the hollow shaft 22 and the knob 11 is fixedly secured to the outer end. A switch arm or actuator 74 is fixed to the inner end of the shaft 73 by a lock screw 75 and is angularly positioned in accordance with the movement of the knob 11. An interlock spring 76 similar in construction but smaller than spring 72 is disposed between the inner face of the knob 11 and the adjacent face of the dial 7. The force of spring 76 is sufficient to interlock the knob 11 to the dial 7 such that it moves therewith when the dial 7 is rotated. However, the force of spring 76 is less than that of spring 72 and consequently when the knob 11 is moved directly, the movement is independent of the dial 7 and gear 21 which remain stationary. As a result, the knob 11 can be initially set to a final temperature setting on the dial 7. During operation of the controller 3, the movement of the dial gear 21 is transmitted through the dial 7 to the knob 11 which moves therewith and maintains the predetermined positioning of the knob 11 on the dial. When the final temperature is arrived at, and the dial 7 is positioned with that temperature reading in alignment with the reading line 10 of the indicator plate 9, the switch actuator 74 engages the switch 69 which is properly mounted behind the panel 6 for operation thereby.

In the illustrated embodiment of the invention, a small switch mounting unit 77 includes suitable insulating means 78 which are secured to the back side of the panel 6. The switch 69 in the form of a pair of leaf spring contacts is secured to means 78 with the end of one of the leaf springs extending into the path of the actuator 74 corresponding to the position of the knob 11 with the integral pointer 12 aligned with the reading line 10 of the indicator plate 9. Leads 79 from the leaf spring switch 69 connects the switch in the circuit of the timer motor 23.

The operation of the illustrated embodiment of the invention is summarized as follows.

The temperature rise rate knob 13 is set with respect to the given indicia 15 to provide the rate of temperature rise in degrees per hour. This automatically adjusts the movement of pawl 33 of the cam drive 24 to produce the corresponding degrees per hour increase. The reset pin 17 is depressed and the thermostat dial 7 is grasped by the rim and rotated slowly until the heat source 4 just begins to operate. The dial is then set at the temperature in the barn and is indicated by the alignment of the temperature indicia 8 with the reading line 10 on the indicator plate 9. The pin 17 is released and connects the timer motor 23 through the adjustable cam drive 24 and the gear train 25 to the dial gear 21 for automatic advancing of the temperature regulator 19. The final temperature setting knob 11 is then rotated and moves independently of the dial 7 to the final temperature desired.

The timer motor 23 operates continuously to rotate the cam 31 which as a result of the eccentric mounting causes the cam pawl 33 to reciprocate in a vertical direction. Although the force of the coil spring 43 will urge the upper end of the pawl arm 38 toward wheel 41 to engage the teeth 39 and notches 40, the cam 31 preferably rotates in a direction which tends to pivot the pawl 33 into engagement with the ratchet wheel 41 to insure the interengagement. As illustrated in FIG. 2, the cam should preferably rotate in a clockwise direction.

The spring 43 also continuously urges the pawl 33 downwardly to maintain engagement of the pin follower 42 with the edge of the cam 31. However, when the guide post 64 engages the stepped upper edge 63 of the plate 61, further downward movement of the pawl 33 is prevented. The cam 31 continues to rotate with the edge of the cam moving away from the pin follower 42 and then returning into engagement with the follower pin 42 to move it and the attached pawl 33 upwardly. In this manner, the length of the stroke of the pawl 33 is adjusted to provide the desired rate movement. The cam 31 rotates continuously and progressively increases the setting of the temperature regulator 19 in small equal sub-increments which in total equal the desired temperature increment or rise in degrees per hour.

When the final temperature is reached, the dial 7 and the attached knob 11 are positioned in alignment with the reading line 10 of the indicator plate 9 due to interlocking action of spring 76. The switch actuator 74 at that time moves into and opens switch 69 and breaks the circuit to the timer motor 23. As a result, the temperature regulator 19 is held at the final temperature setting and maintains the final temperature until the control system is again reset.

When it is desired to reset the control, the temperature rise control knob 13 and the final temperature knob 11 are reset in accordance with the desired operation of the circuit. The dial 7 has been set due to the previous action at the average temperature in the barn 2 and consequently does not have to be reset. The thermostat regulator 19 will again be advanced to the selected new final temperature and stop. In this manner, the three steps of yellowing, leaf drying and stem drying may be controlled.

The present invention thus provides a very simply operated temperature or other control which can be employed with a very minimum of skill. The control apparatus is of a relatively simple and durable construction and provides highly satisfactory and long life operation.

Various modes of carrying out the invention are contemplated as being within the scope of the following claims particularly pointing out and distinctly claiming the subject matter which is regarded as the invention.

I claim:

1. In a temperature control for resetting a thermostat in predetermined temperature increments per unit of time in equal sub-increments, said control comprising,
   (a) a timer motor,
   (b) a cam coupled to be continuously rotated by said motor at a rate corresponding to said sub-increments,
   (c) a cam pawl mounted for reciprocation with respect to the cam and having a follower resiliently urged into engagement with said cam, said cam pawl having an outer end provided with ratchet teeth on the edge, and
   (d) a ratchet wheel rotatably mounted in mesh with said cam pawls and actuated by said cam pawls as the cam pawl moves outwardly of the cam and effectively released from the cam pawl as the cam pawl moves toward the cam, adjustable stop means disposed in the path of the cam pawl as the pawl moves toward the cam to said pawl to variably restrict the movement of the pawl and hold the pawl in spaced relation to the cam for predetermined partial portions of each cycle and thereby varying the movement of the pawl and the temperature increment per unit of time.

2. In an automatic control unit,
   (a) a rotatable input shaft,
   (b) a rotating cam eccentrically mounted on said shaft,
   (c) a plate-like pawl mounted for essentially rectilinear motion relative to said shaft and having a slot extending in the direction of motion with the shaft extended therethrough to form a lost motion guide connection and having a cam follower overlying the periphery of the cam, and
   (d) resilient means connected to said pawl and continuously urging the cam follower into engagement with the cam periphery, and
   (e) a stepped plate having a series of offset control surfaces adjustably mounted for selective engagement of different control surfaces with said pawl to adjust the motion thereof.

3. A control for actuating a drive means between the limits of an initial and a final condition,
   (a) a reference member having a reference position and movable from the reference position in accordance with the initial condition and movable in proportion to the difference between the initial and final conditions,
   (b) a control member releasably and frictionally coupled to said first named member for selective simultaneous movement therewith and individual movement relative thereto for setting in accordance with difference between the initial condition and the final condition,
   (c) means connecting said drive means to said first named member to simultaneously move said reference member and said control member, and
   (d) disenabling means connected to said drive means and having a predetermined disenabling position for disenabling said drive means and coupled to said control member for movement from the disenabling position with the presetting of the control member and moved therewith toward said disenabling position.

4. In a temperature regulating device for adjusting a thermostatic control having a rotating input,
   (a) a temperature setting dial,
   (b) a dial gear connected to said dial for movement therewith and adapted to be coupled to said rotating input,
   (c) a final temperature indicator associated with the dial for positioning relative thereto,
   (d) means coupling said indicator to said dial to selectively allow independent movement of the indicator and simultaneous movement with the dial,
   (e) a switch control means preset by said indicator for deactivating said drive means in synchronism with the positioning of the dial to the final temperature,
   (f) a gear train carried by a pivotally mounted gear plate and having an input ratchet wheel,
   (g) spring means urging said gear plate to engage said gear train and said dial gear,
   (h) a pawl mounted for rectilinear reciprocation and having a projecting arm provided with teeth operatively coupled with said ratchet wheel during one direction of movement of said pawl,
   (i) an eccentrically mounted circular cam,
   (j) a cam follower secured to the cam pawl and resiliently urged into engagement with said rotating cam to reciprocate said pawl, and
   (k) stop means selectively positioned in the path of the pawl to restrict the return movement of the pawl to adjust the stroke of the pawl and the cyclic motion of the ratchet wheel.

5. In a temperature regulating device for adjusting a thermostatic control having a rotating input,
   (a) a temperature setting dial adapted to be set at a first temperature and coupled to said thermostatic control,
   (b) a final temperature indicator associated with the dial for positioning to a final temperature reading on the dial,
   (c) coupling means coupling said indicator to said dial to selectively allow independent movement of the indicator and simultaneous movement thereof,
   (d) a switch control means preset by said indicator for deactivating said drive means in synchronism with the positioning of the dial to the final temperature,
   (e) a gear train carried by a gear plate having an input ratchet wheel with peripheral notches,
   (f) means to pivotally mount said gear plate for releasably coupling said gear train to said thermostatic control in common with said dial,
   (g) spring means urging said gear plate to hold the gear train coupled to said thermostatic control,
   (h) a cam pawl mounted for rectilinear reciprocation and having a projecting arm provided with teeth on edges engaging said notches and rotating the wheel only during one direction of pawl movement,
   (i) an eccentrically mounted circular cam,
   (j) a cam follower fixed to the cam pawl and engaging the edge of said rotating cam,
   (k) spring means urging said pawl toward the cam and said follower into engagement with the cam edge,
   (l) a stepped plate adjustably mounted adjacent the plate and having an edge with a plurality of offset edges,
   (m) a limit post on the pawl selectively engaging an aligned offset edge on the stepped plate to limit the stroke of the pawl, and
   (n) means to releasably secure the stepped plate in selective alignment with the limit post.

6. A temperature regulating device in accordance with claim 5 wherein said coupling means comprises,
   (a) a mounting panel,
   (b) a hollow dial shaft having said dial secured to one end thereof and rotatably mounted in said panel, (c) a thermostat dial member secured to the inner end of the dial shaft,
(d) a spring means disposed between the dial member and the panel to releasably hold the shaft in a set position,
(e) a shaft rotatably disposed in the hollow shaft and having said final temperature indicator secured thereto, and
(f) a spring means disposed between the dial member and the indicator to hold the indicator in a set position, said first named spring means having a greater holding force than said second named spring whereby said indicator can be moved independently of said dial and moves with said dial.

References Cited by the Examiner
UNITED STATES PATENTS

| | | | |
|---|---|---|---|
| 2,117,768 | 5/38 | McNicoll | 236—46 |
| 2,123,978 | 7/38 | Wagner | 74—582 |
| 2,172,820 | 9/39 | Kronmiller | 236—46 |
| 2,989,878 | 6/61 | Drawzkowski | 74—625 |
| 3,078,732 | 2/63 | Schacht | 74—125 |

BROUGHTON G. DURHAM, *Primary Examiner.*

DON A. WAITE, *Examiner.*